US012719989B2

(12) United States Patent
Huo et al.

(10) Patent No.: US 12,719,989 B2
(45) Date of Patent: Aug. 25, 2026

(54) METHOD TO ISOLATE IMAGE CAPTURING DEVICES BETWEEN REMOTE DESKTOP SESSIONS FOR SCANNER REDIRECTION

(71) Applicant: Omnissa, LLC, Mountain View, CA (US)

(72) Inventors: Huiyong Huo, Beijing (CN); Zhongzheng Tu, Beijing (CN); Mingsheng Zang, Beijing (CN); Kai Xiang, Beijing (CN); Ning Ge, Beijing (CN); Tao Jin, Beijing (CN)

(73) Assignee: Omnissa, LLC, Mountain View, CA (US)

(*) Notice: Subject to any disclaimer, the term of this patent is extended or adjusted under 35 U.S.C. 154(b) by 352 days.

(21) Appl. No.: 18/487,883

(22) Filed: Oct. 16, 2023

(65) Prior Publication Data

US 2025/0080663 A1 Mar. 6, 2025

(30) Foreign Application Priority Data

Aug. 28, 2023 (WO) ................ PCT/CN2023/115164

(51) Int. Cl.
*H04N 1/32* (2006.01)
*H04N 1/00* (2006.01)

(52) U.S. Cl.
CPC ..... *H04N 1/00114* (2013.01); *H04N 1/00244* (2013.01); *H04N 1/32101* (2013.01)

(58) Field of Classification Search
CPC ........... H04N 1/00114; H04N 1/00244; H04N 1/32101; H04N 1/00973; G06F 3/1454
USPC ................................ 358/1.15; 715/740, 778
See application file for complete search history.

(56) References Cited

U.S. PATENT DOCUMENTS

| | | | |
|---|---|---|---|
| 11,704,634 | B1 | 7/2023 | Medina, Iii |
| 11,716,428 | B1 | 8/2023 | Tu |
| 11,750,749 | B1 | 9/2023 | Tu |
| 2006/0070090 | A1 | 3/2006 | Gulkis |
| 2006/0222065 | A1 | 10/2006 | Ramakrishnan |
| 2006/0256858 | A1 | 11/2006 | Chin |

(Continued)

OTHER PUBLICATIONS

"Document Scanner—TWAIN, WIA, ISIS or SANE," Jan. 7, 2020, Dynamsoft, 5 pages, https://www.dynamsoft.com/blog/insights/document-scanning-twain-wia-isis-sane.

*Primary Examiner* — Jamares Q Washington
(74) *Attorney, Agent, or Firm* — Kim & Stewart LLP

(57) ABSTRACT

A scanner redirection method for a remote desktop computer system, wherein the remote desktop computer system includes a plurality of client computers and a remote computer, and wherein the remote computer concurrently has a first remote desktop session with a first client computer and a second remote desktop session with a second client computer, the scanner redirection method comprising: creating a first list of image capturing devices that are connected to the first client computer; creating a second list of image capturing devices that are connected to the second client computer; in response to receiving from the first client computer a selection of a first image capturing device from the first list, transmitting to the first client computer, an identifier (ID) of the first image capturing device; and after transmitting the ID, receiving from the first client computer, an image created by the first image capturing device.

20 Claims, 10 Drawing Sheets

(56) References Cited

U.S. PATENT DOCUMENTS

| | | | | |
|---|---|---|---|---|
| 2007/0211310 | A1 | 9/2007 | Kadota | |
| 2008/0297812 | A1 | 12/2008 | Watanabe | |
| 2009/0080035 | A1 | 3/2009 | Downs | |
| 2009/0091555 | A1 | 4/2009 | Do | |
| 2009/0237728 | A1* | 9/2009 | Yamamoto | H04N 1/00204 358/1.15 |
| 2011/0055765 | A1 | 3/2011 | Neubrand | |
| 2012/0128058 | A1 | 5/2012 | Bakharov | |
| 2013/0198462 | A1 | 8/2013 | Serlet | |
| 2016/0198081 | A1 | 7/2016 | Thomas | |
| 2017/0127095 | A1 | 5/2017 | Park | |
| 2017/0264649 | A1* | 9/2017 | Sonar | G06F 13/387 |
| 2018/0234517 | A1 | 8/2018 | Venkatesh | |
| 2021/0092238 | A1 | 3/2021 | Gill | |

* cited by examiner

METHOD TO ISOLATE IMAGE CAPTURING DEVICES BETWEEN REMOTE DESKTOP SESSIONS FOR SCANNER REDIRECTION

CROSS-REFERENCE

This application is based upon and claims the benefit of priority from International Patent Application No. PCT/CN2023/115164, filed on Aug. 28, 2023, the entire contents of which are incorporated herein by reference.

BACKGROUND

Many organizations rely on remote desktop (RD) services to provide lean, flexible computing environments. RD scanning is one important feature required by the end user of an RD service. Through RD scanning, an application executing on a remote (agent) computer such as a server acquires images from client-side image capturing devices (ICDs) such as scanners and digital cameras. Specifically, through scanner redirection, the remote computer transmits a request to a client computer such as a laptop for an image, the client computer being connected to an ICD. The client computer then acquires the image from the ICD and transmits it to the remote computer.

Some RD service solutions allow for multiple users to concurrently establish RD sessions with the same endpoint. For example, the endpoint may be a virtual machine (VM) installed on the agent computer, and multiple users may connect to that same VM from their respective client computers. Each user's session is identified by its own unique session identifier (ID), and each user experiences a separate RD experience even though those users are connected to the same VM. Those users may also have their own ICDs connected to their client computers, in which case those users may rely on RD scanning to acquire images from their respective ICDs for applications in their respective RD sessions.

RD scanning can be problematic when there are multiple users concurrently connected to the same endpoint. When any user decides to use the RD scanning feature, that user is presented with several ICDs to acquire images with. Some of those ICDs may not even be connected to that user's client computer but may instead be connected to another user's client computer, the other user having a separate RD session with the same endpoint. This may be confusing, especially if multiple users have the same ICD model (with the same name), in which case a user may not know which ICD to select.

Furthermore, there are security concerns with a user being able to select an ICD connected to another user's client computer. For example, a first user may select a second user's ICD, the second user having sensitive information in the ICD such as a passport. The first user may then acquire an image of the second user's sensitive information by causing the endpoint to request the image from the second user's client computer. A scanner redirection solution that prevents such usability and security issues is needed.

SUMMARY

Accordingly, embodiments provide for an RD computer system, wherein the RD computer system includes a plurality of client computers and a VM. The client computers include RD software that is configured to communicate with ICDs. According to some embodiments, the RD software of a client computer includes a "data source," which is a component that communicates with ICDs. According to other embodiments, the RD software of a client computer includes an "image capture core," which is a service that exposes application programming interfaces (APIs) for communicating with ICDs. The APIs are used for, e.g., adjusting settings of ICDs and requesting images therefrom.

Embodiments provide a scanner redirection method for an RD computer system. The RD computer system includes a plurality of client computers and a remote computer. The remote computer concurrently has a first RD session with a first client computer of the client computers and a second RD session with a second client computer of the client computers. The scanner redirection method includes the steps of: creating a first list of ICDs that are connected to the first client computer, wherein the first list is accessible to the first RD session but is inaccessible to the second RD session; creating a second list of ICDs that are connected to the second client computer, wherein the second list is accessible to the second RD session but is inaccessible to the first RD session; in response to receiving from the first client computer a selection of a first ICD from the first list, transmitting to the first client computer, an ID of the first ICD; and after transmitting the ID of the first ICD, receiving from the first client computer, an image created by the first ICD, and then providing the image received from the first client computer to an application running in the first RD session.

Further embodiments include a non-transitory computer-readable storage medium comprising instructions that cause an RD computer system to carry out the above method, as well as an RD computer system configured to carry out the above method.

DETAILED DESCRIPTION

Figure 1:
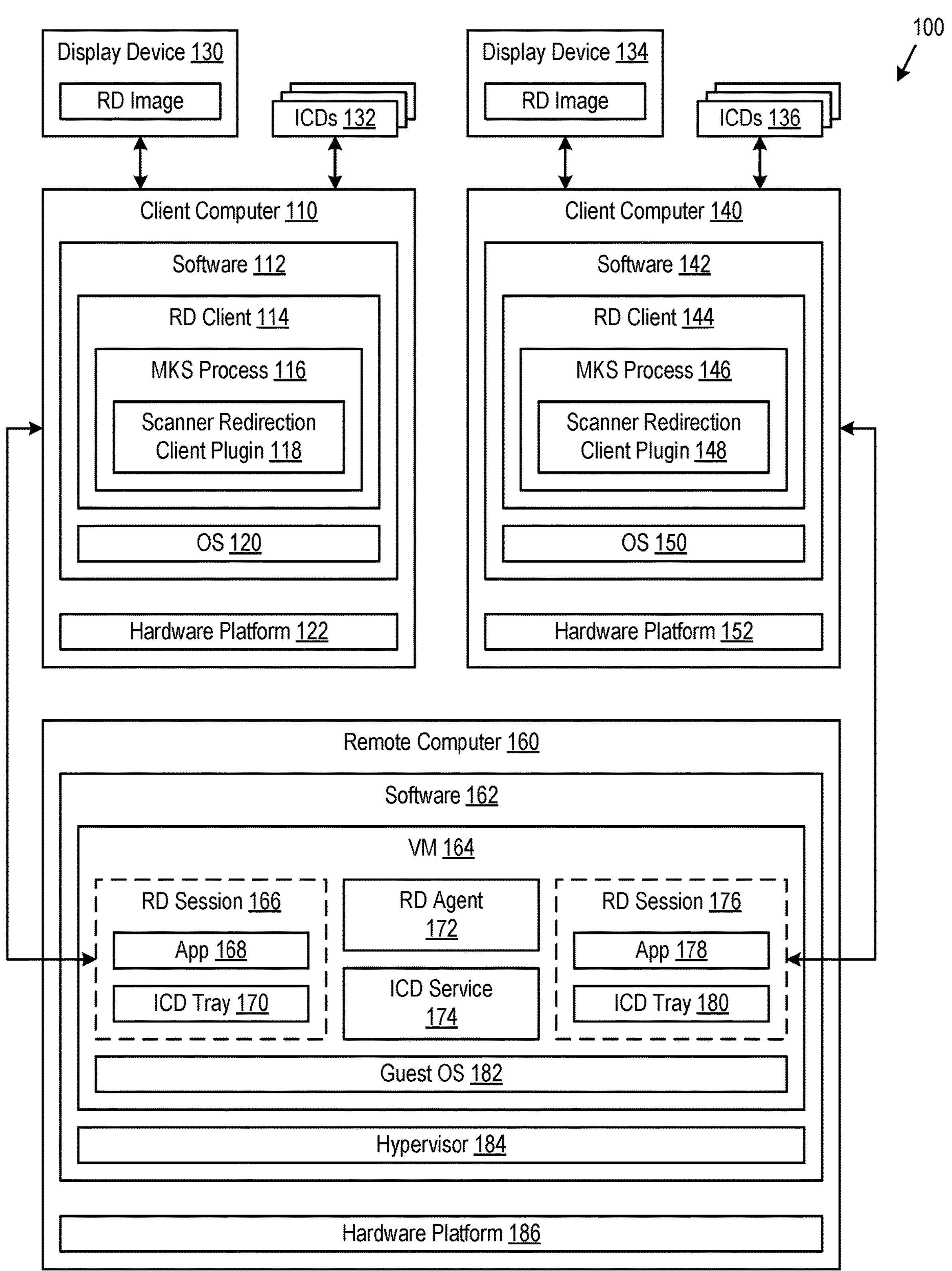
FIG. 1 is a block diagram of an RD computer system in which embodiments may be implemented.

Techniques are described for realizing scanner redirection during concurrent RD sessions between a plurality of client computers and a remote computer. The different RD sessions are also referred to herein as different RDs. A VM running in the remote computer executes applications for each of the RD sessions, the applications consuming images from respective ICDs. The ICDs are connected to the client computers. To acquire the images, the applications of the remote computer request the images from applications of the respective client computers, referred to as RD client applications. The RD client applications acquire the images from the ICDs and transmit them to the applications of the respective RD sessions.

According to a first embodiment, the client computers and the VM all utilize the same scanning protocol such as the TWAIN protocol. Pursuant to the common scanning protocol, the RD client applications and the applications of the VM utilize "data source managers" and "data sources." For the applications of the VM, the data source managers communicate with "virtual" data sources, the virtual data sources requesting images from the client computers. For the client computers, the data source managers communicates with data sources that acquires images from ICDs.

According to a second embodiment, the client computers have different OSs than that of the VM. As a result, the client computers use one scanning protocol such as the Image Capture (ICA) Framework, and the VM uses another scanning protocol such as the TWAIN protocol. Pursuant to its respective scanning protocol, the VM still utilizes data source managers and virtual data sources. Pursuant to the other scanning protocol, the client computers each utilize an "image capture core" that communicates directly with ICDs (not through separate data source components) to acquire images. Other embodiments also include a combination of client computers using the same scanning protocol as the VM and client computers using a different scanning protocol than that of the VM.

Upon the client computers establishing RD sessions with the VM, the VM creates applications for each of the RD sessions for managing ICDs, referred to as "ICD tray processes." Each ICD tray process creates a list of ICDs for its respective session. A user selects the respective ICD tray process, e.g., by clicking on the ICD tray process in a graphical user interface (GUI). The ICD tray process then displays a list of ICDs for the user to select from, which only includes ICDs connected to that user's computer. Accordingly, the user is not confused by seeing ICDs that are connected to other computers. Additionally, if there is sensitive information in that user's ICD, that sensitive information is not at risk of being exposed to other users' RD sessions, those other users not being presented the option to select that ICD to acquire images from. These and further aspects of the invention are discussed below with respect to the drawings.

FIG. 1 is a block diagram of an RD computer system 100 in which embodiments may be implemented. RD computer system 100 includes client computers 110 and 140 and a remote (agent) computer 160 (remote from client computers 110 and 140). For example, client computers 110 and 140 may be laptops, desktop computers, or servers in the same or separate private data centers controlled by a particular organization. Remote computer 160 may be a server provisioned in a private data center controlled by the organization or provisioned in a public data center that includes servers of other organizations.

Client computers 110 and 140 are constructed on hardware platforms 122 and 152, respectively, such as x86 architecture platforms. Hardware platforms 122 and 152 each includes conventional components of a computing device (not shown), such as one or more central processing units (CPUs), memory such as random-access memory (RAM), local storage such as one or more magnetic drives or solid-state drives (SSDs), and one or more network interface cards (NICs). The NICs enable client computers 110 and 140 to communicate with remote computer 160 over a network (not shown) such as the Internet.

Hardware platforms 122 and 152 support software 112 and 142, respectively, which include RD client applications 114 and 144 running on commodity operating systems (OSs) 120 and 150, respectively. For example, RD clients 114 and 144 may be instances of VMware Horizon® Client, available from VMware, Inc. The term "desktop" in remote desktop (RD) refers to an instance of an interactive environment provided by an OS and software applications, typically in the form of display and sound output and keyboard and mouse input. Through RD clients 114 and 144, two separate users concurrently access RDs from any locations, those users being referred to herein as users of client computers 110 and 140 or as users of RD sessions 166 and 176. RD clients 114 and 144 include mouse, keyboard, screen (MKS) processes 116 and 146, respectively. Remote computer 160 transmits images of RDs to MKS processes 116 and 146. RD clients 114 and 144 then communicate with display devices 130 and 134, respectively, such as monitors on which the users view respective RD images.

When the users perform actions in respective RDs such as clicking computer mice or typing on keyboards, the users' actions are received by MKS processes 116 and 146. MKS processes 116 and 146 transmit the users' actions to remote computer 160 to update the users' RDS accordingly. Scanner redirection client plugins 118 and 148 acquire images from ICDs connected to respective client computers, including ICDs 132 of one user, which are connected to client computer 110, and ICDs 136 of the other user, which are connected to client computer 140. Images acquired from the ICDs are transmitted to remote computer 160.

In embodiments illustrated herein, RDs are running in a VM 164 of remote computer 160. Remote computer 160 includes software 162 and a hardware platform 186. Hardware platform 186 is, e.g., an x86 architecture platform including the conventional components of a computer described above for hardware platforms 122 and 152. CPU(s) of hardware platform 186 are configured to execute instructions such as executable instructions that perform one or more operations described herein, which may be stored in memory of hardware platform 186.

Software 162 includes a hypervisor 184, which is a virtualization software layer that supports a VM execution space within which VMs such as VM 164 are concurrently instantiated and executed. One example of hypervisor 184 is a VMware ESX® hypervisor, available from VMware, Inc. VM 164 includes an RD agent application 172 and an ICD service 174 running on a commodity guest OS 182. VM 164 also includes, for RD session 166 with client computer 110, an application 168 and an ICD tray process 170, and for RD session 176 with client computer 140, an application 178 and an ICD tray process 180. Applications 168 and 178 and ICD tray processes 170 and 180 also run on guest OS 182.

RD agent 172 communicates with RD clients 114 and 144 to concurrently establish RD sessions 166 and 176 for respective users. As part of the RD sessions, RD agent 172 periodically transmits updated RD images to RD clients 114 and 144 to be displayed on display devices 130 and 134, respectively. RD clients 114 and 144 and RD agent 172 are also referred to individually and collectively herein as RD software. Applications 168 and 178 consume images created by ICDs connected to client computers 110 and 140, respectively. To do so, applications 168 and 178 have been modified to handle scanner redirection with RD clients 114 and 144, respectively. For example, applications 168 and 178 may be separate instances of Adobe Photoshop,® which the users access through respective RD sessions.

One functionality of ICD service 174 is to create ICD tray processes 170 and 180, as discussed further below in conjunction with FIG. 5. ICD tray processes 170 and 180 manage lists of ICDs (not shown in FIG. 1) for respective users to select from. Application 168 and ICD tray process 170 are only accessible to client computer 110 via RD session 166, and application 178 and ICD tray process 180 are only accessible to client computer 140 via RD session 176. ICD tray process 170 prompts the user of RD session 166 to select from ICDs 132 for acquiring images, while ICD tray process 180 prompts the user of RD session 176 to select from ICDs 136 for acquiring images. A particular configuration of RD computer system 100 is illustrated in FIG. 1, but it should be recognized that one or more embodiments may be practiced with other computer system configurations.

Figure 2:
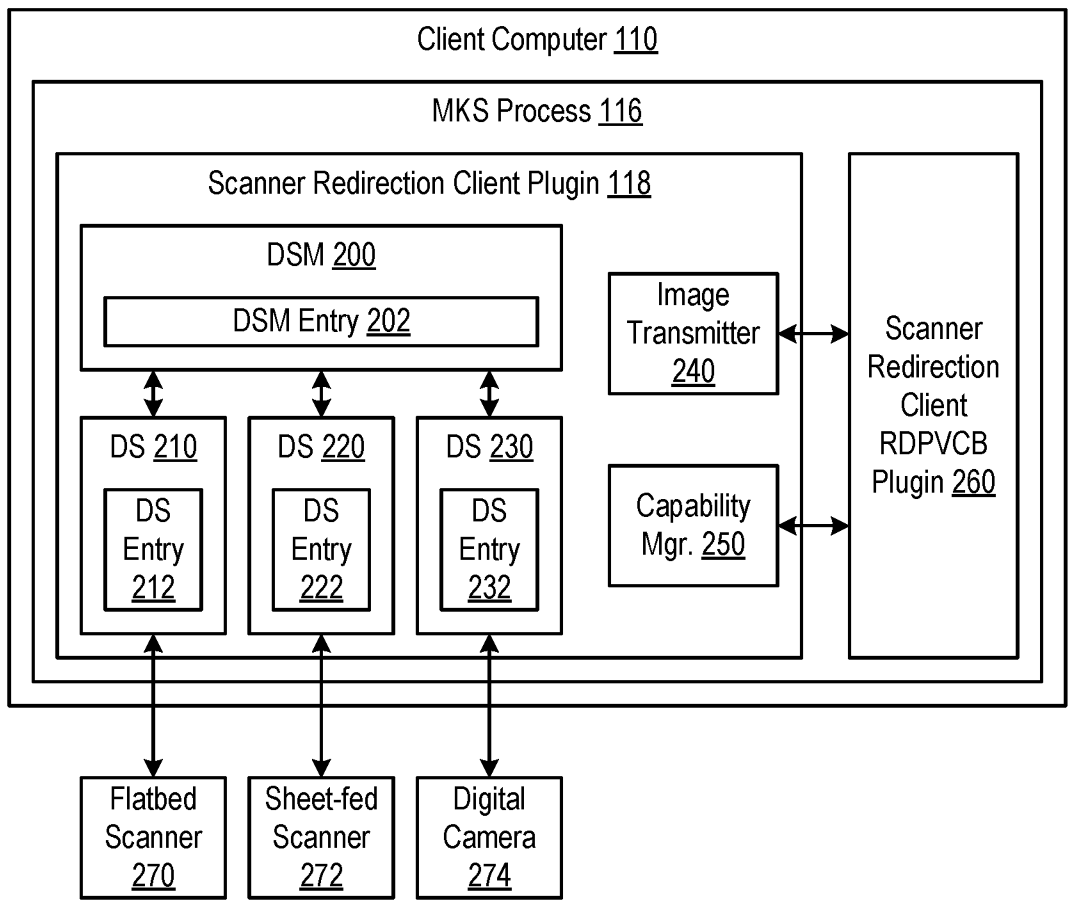
FIG. 2 is a block diagram of a client computer of the RD computer system and a group of ICDs connected to the client computer, according to a first embodiment.

FIG. 2 is a block diagram of client computer 110 and a group of ICDs connected thereto, according to the first embodiment. Although not illustrated in FIG. 2, according to the first embodiment, client computer 140 includes similar components and functionalities as client computer 110. According to the first embodiment, client computer 110 uses the same scanning protocol as VM 164, e.g., the TWAIN protocol. In the example of FIG. 2, there are three drivers installed in client computer 110 for controlling the depicted ICDs: one for controlling a flatbed scanner 270, one for controlling a sheet-fed scanner 272, and one for controlling a digital camera 274.

In addition to scanner redirection client plugin 118, MKS process 116 includes a scanner redirection client remote desktop protocol virtual channel bridge (RDPVCB) plugin 260. Client RDPVCB plugin 260 is communication software that is configured to communicate with VM 164 via transmission control protocol (TCP) or user datagram protocol (UDP) channels. Such channels are established between client RDPVCB plugin 260 and VM 164. Client RDPVCB plugin 260 is also configured to communicate with an image transmitter 240 and a capability manager 250, which are discussed further below.

Scanner redirection client plugin 118 includes a DSM 200, which communicates with DSs 210, 220, and 230 to acquire images from ICDs. To communicate with ICDs, scanner redirection client plugin 118 calls a DSM entry function 202 to provide commands to DSM 200. DSM 200 then calls a DS entry function 212, 222, or 232 to transmit commands to DS 210, 220, or 230, respectively. The relevant DS then returns results to DSM 200 via return values of the DS entry call. Similarly, DSM 200 returns results to scanner redirection client plugin 118 via DSM entry 202 return values.

When one of the DSs acquires an image from a corresponding ICD, image transmitter 240 transmits the image to VM 164 via client RDPVCB plugin 260. Additionally, one of the DSs may acquire capabilities from a corresponding ICD such as different supported resolutions for acquired images. Capability manager 250 transmits the capabilities to VM 164 via client RDPVCB plugin 260. If the user specifies to adjust settings for a particular ICD, scanner redirection client plugin 118 instructs the corresponding DS via DSM 200 to control the ICD to adjust those settings.

Figure 3:
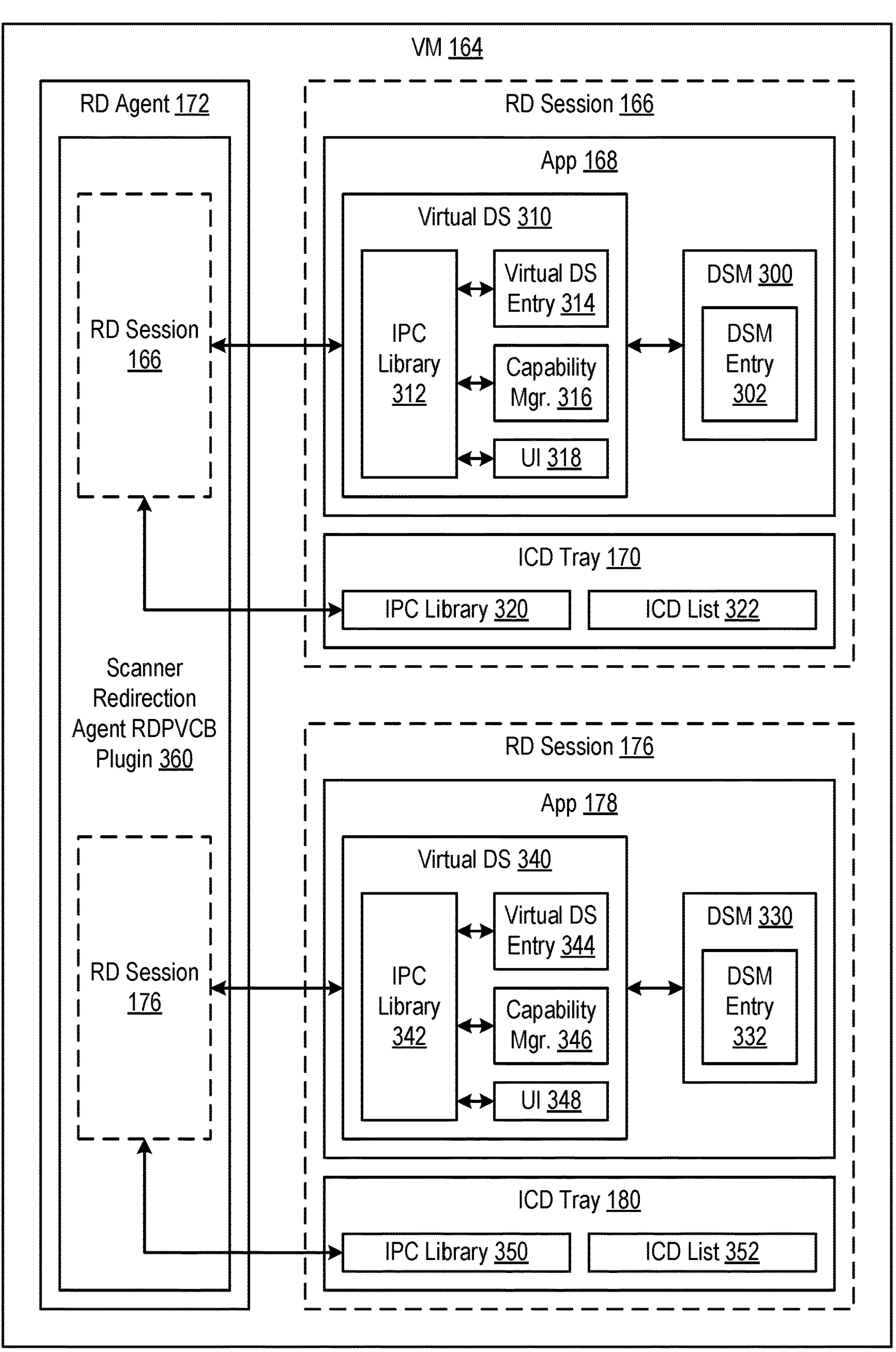
FIG. 3 is a block diagram of a VM of a remote computer of the RD computer system, according to embodiments.

FIG. 3 is a block diagram of VM 164. VM 164 concurrently supports multiple RD sessions, including RD sessions 166 and 176. As part of RD session 166, one user accesses application 168 and ICD tray process 170 from client computer 110. As part of RD session 176, the other user accesses application 178 and ICD tray process 180 from client computer 140.

RD agent 172 includes a scanner redirection agent RDPVCB plugin 360. Agent RDPVCB plugin 360 is communication software that is configured to communicate with client computers 110 and 140 via TCP or UDP channels. Those channels are established between agent RDPVCB plugin 360 and client RDPVCB plugins of the client computers (e.g., client RDPVCB plugin 260 of client computer 110) to facilitate communications between VM 164 and client computers 110 and 140. Agent RDPVCB plugin 360 is also configured to communicate with applications 168 and 178 and with ICD tray processes 170 and 180.

ICD tray processes 170 and 180 are used by respective users for selecting ICDs connected to respective client computers for scanner redirection functionalities. ICD tray processes 170 and 180 include inter-process communication (IPC) libraries 320 and 350, respectively, which facilitate communications with agent RDPVCB plugin 360. ICD tray processes 170 and 180 also include ICD lists 322 and 352, respectively, which are lists of ICDs for which drivers have been installed in respective client computers. For example, to interact with ICD tray process 170, the user of client computer 110 may click a toolbar menu item in RD session 166, which results in ICD tray process 170 showing the contents of ICD list 322. Upon the users selecting ICDs for acquiring images from, ICD tray processes 170 and 180 transmit IDs of the selected ICDs to respective client computers via agent RDPVCB plugin 360.

Applications 168 and 178 include DSMs 300 and 330, respectively, that communicate with virtual DSs 310 and 340. Instead of communicating directly with ICDs, virtual DSs 310 and 340 communicate with client computers 110 and 140, respectively, e.g., to request images. Specifically, applications 168 and 178 call DSM entry functions 302 and 332, respectively, to transmit commands to DSMs 300 and 330. DSMs 300 and 330 then call virtual DS entry functions 314 and 344, respectively, to transmit commands to virtual DSs 310 and 340. Virtual DSs 310 and 340 also return results to DSMs 300 and 330, respectively, via return values of virtual DS entry 314 and 344 calls. Similarly, DSMs 300 and 330 return results via DSM entry 302 and 332 return values.

In addition to virtual DS entries 314 and 344, virtual DSs 310 and 340 include IPC libraries 312 and 342, respectively, capability managers 316 and 346, respectively, and user interfaces (UIs) 318 and 348, respectively. IPC library 312 facilitates communications between agent RDPVCB plugin 360, virtual DS entry 314, capability manager 316, and UI 318 for RD session 166. Similarly, IPC library 342 facilitates communications between agent RDPVCB plugin 360, virtual DS entry 344, capability manager 346, and UI 348 for RD session 176.

Capability managers 316 and 346 cache capabilities of ICDs for respective RD sessions such as different resolutions those ICDs can acquire images at, those capabilities being received from capability managers of respective client computers. Capability managers 316 and 346 transmit those capabilities to UIs 318 and 348, respectively, to be displayed to respective users. Then, via UIs 318 and 348, respective users adjust various settings such as which resolutions to acquire images at. Capability managers 316 and 346 transmit specified adjustments to respective client computers via agent RDPVCB plugin 360 to be applied to selected ICDs.

Through UIs 318 and 348, the users also trigger the acquiring of images by selected ICDs. Such requests are transmitted to respective client computers via agent RDPVCB plugin 360, and then images are received from respective client computers. Specifically, images are received by virtual DSs 310 and 340 via agent RDPVCB plugin 360. Virtual DSs 310 and 340 then return the images to DSMs 300 and 330 via virtual DS entries 314 and 344, respectively. DSMs 300 and 330 then provide the images to applications 168 and 178, respectively.

Figure 4:
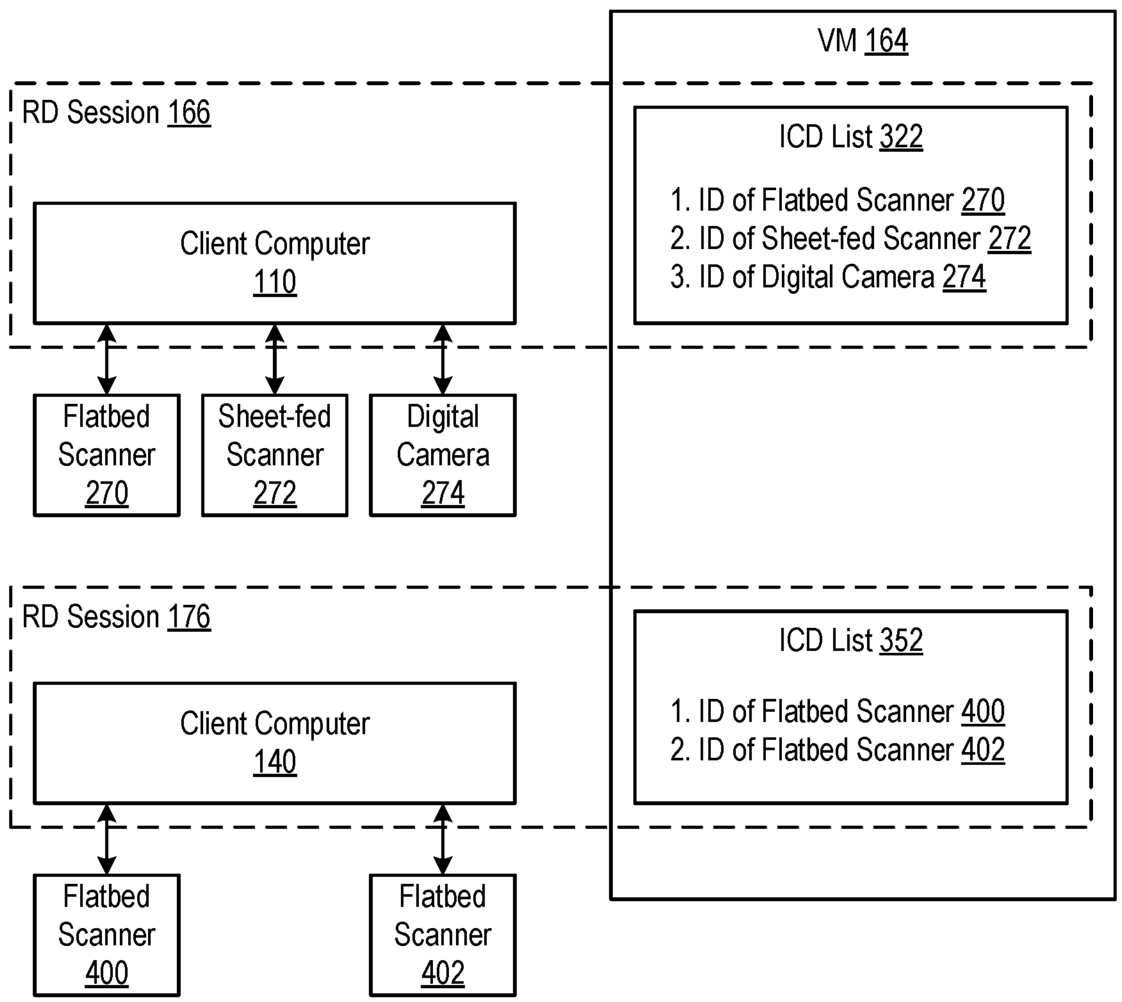
FIG. 4 is a block diagram of a plurality of client computers of the RD computer system and the VM of the remote computer, illustrating a plurality of RD sessions with access to separate lists of ICDs, according to embodiments.

FIG. 4 is a block diagram client computers 110 and 140 and VM 164, illustrating separate RD sessions with access to separate ICD lists, according to embodiments. As illustrated in FIG. 4, the user of client computer 110 has access to three ICDs: flatbed scanner 270, sheet-fed scanner 272, and digital camera 274. In RD session 166, when the user accesses ICD tray process 170, the user views ICD list 322. ICD list 322 includes IDs of only those ICDs connected to client computer 110, not of ICDs connected to other client computers such as to client computer 140. Accordingly, the user of client computer 110 is not confused by seeing ICDs that the user does not recognize. Furthermore, the user is prevented from selecting ICDs of other client computers and causing VM 164 to request images from the other client computers for applications of RD session 166.

The user of client computer 140 has access to two ICDs: a flatbed scanner 400 and a flatbed scanner 402. In RD session 176, when the user accesses the respective ICD tray process, the user views ICD list 352. ICD list 352 includes IDs of only those ICDs connected to client computer 140, not of ICDs connected to other client computers such as to client computer 110. Accordingly, the user of client computer 140 is not confused by seeing ICDs that the user does not recognize. Furthermore, the user is prevented from selecting ICDs of other client computers and causing VM 164 to request images from the other client computers for applications of RD session 176.

Figure 5:
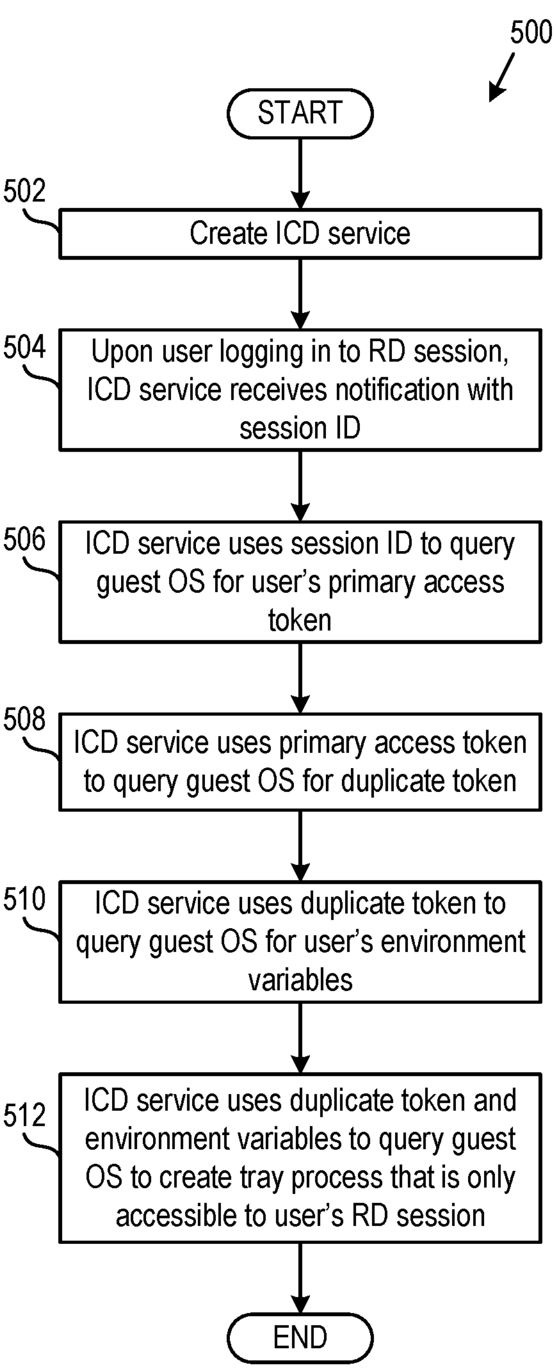
FIG. 5 is a flow diagram of a method performed by the VM of the remote computer to create an ICD tray process that enables a user to select ICDs associated with that user's session, according to embodiments.

FIG. 5 is a flow diagram of a method 500 performed by VM 164 to create an ICD tray process that enables a user to select ICDs associated with that user's session, according to embodiments. At step 502, guest OS 182 creates ICD service 174, which is a system-level service. At step 504, upon a user logging in to an RD session such as RD session 166, ICD service 174 receives a notification with a session ID for the RD session. At step 506, ICD service 174 uses the session ID to query guest OS 182 for the user's primary access token, i.e., for a primary access token corresponding to the session token. The primary access token is a cryptographic key used for authenticating with guest OS 182 as the user of the RD session.

At step 508, ICD service 174 uses the primary access token to query guest OS 182 for a duplicate token. The duplicate token is a copy of the primary access token but with permissions to be used by ICD service 174 for authenticating with guest OS 182. At step 510, ICD service 174 uses the duplicate token to query guest OS 182 for the user's environment variables such as file system paths of VM 164 for the user's RD session. At step 512, ICD service 174 uses the duplicate token and the environment variables to query guest OS 182 to create an ICD tray process that is only accessible to the user's RD session, e.g., to create ICD tray process 170 that is accessible to RD session 166 but inaccessible to RD session 176. After step 512, method 500 ends. Upon verifying the duplicate token, guest OS 182 creates the requested ICD tray process based on the environment variables. It should be noted that steps 504-512 are performed automatically each time a user establishes and logs in to an RD session.

Figure 6:
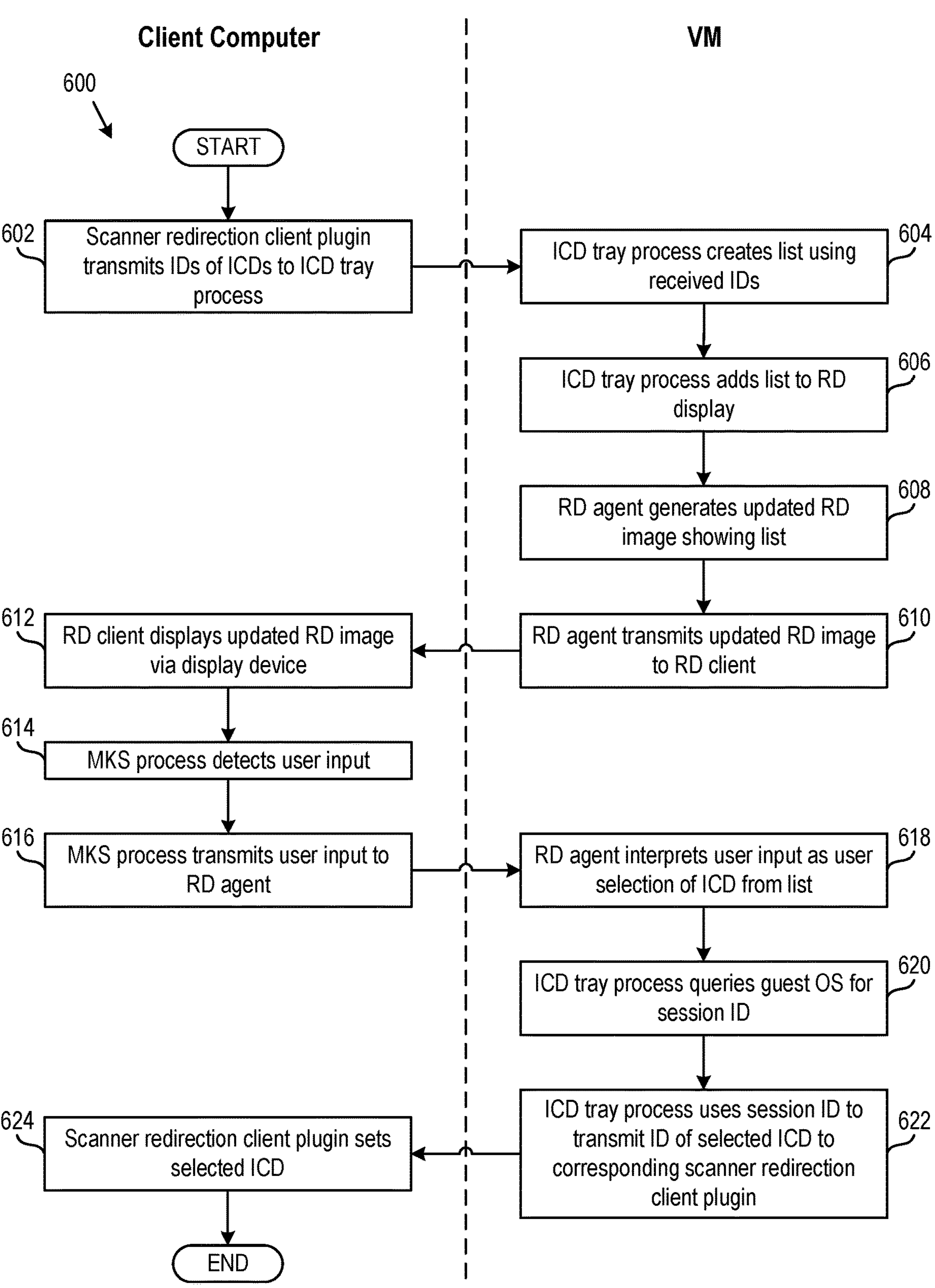
FIG. 6 is a flow diagram of a method performed by a client computer and the VM of the remote computer to select an ICD for acquiring images from, according to embodiments.

FIG. 6 is a flow diagram of a method 600 performed by a client computer and VM 164 to select an ICD for acquiring images from, according to embodiments. Method 600 is performed after an ICD tray process is automatically created for a user's RD session. Method 600 is discussed with respect to client computer 110, RD session 166, and ICD tray process 170, but method 600 is similarly performed (e.g., with client computer 140, RD session 176, and ICD tray process 180) for each RD session for users of other RD sessions to select ICDs. At step 602, scanner redirection client plugin 118 transmits a list of ICDs to ICD tray process 170 via a TCP or UDP channel between client RDPVCB plugin 260 and agent RDPVCB plugin 360. The list of ICDs includes IDs of ICDs for which drivers have been installed in client computer 110.

At step 604, ICD tray process 170 creates ICD list 322, including all the received IDs. At step 606, ICD tray process 170 adds the list to the RD display of RD session 166, e.g., in response to the user thereof clicking a corresponding toolbar menu item. At step 608, RD agent 172 generates an updated RD image, which shows the list added to the RD display by ICD tray process 170. At step 610, RD agent 172 transmits the updated RD image to RD client 114.

At step 612, RD client 114 displays the RD image via display device 130. At step 614, MKS process 116 detects user input, e.g., the user clicking a mouse. At step 616, MKS process 116 transmits the user input to RD agent 172. At step 618, RD agent 172 interprets the user input as user selection of one of the ICDs of the list. At step 620, ICD tray process 170 queries guest OS 182 for the session ID of RD session 166.

At step 622, upon receiving the session ID, ICD tray process 170 transmits the ID of the selected ICD to scanner redirection client plugin 118 via agent RDPVCB plugin 360. As discussed earlier, ICD tray process 170 communicates with agent RDPVCB plugin 360 by IPC via IPC library 320. ICD tray process 170 specifies the session ID so agent RDPVCB plugin 360 knows to transmit the list to client computer 110 and not to client computers of other RD sessions. At step 624, scanner redirection client plugin 118 sets the selected ICD. For example, according to the first embodiment, scanner redirection client plugin 118 loads the DS corresponding to the selected to ICD, e.g., DS 210 if the selected ICD is flatbed scanner 270. After step 624, method 600 ends.

Figure 7:
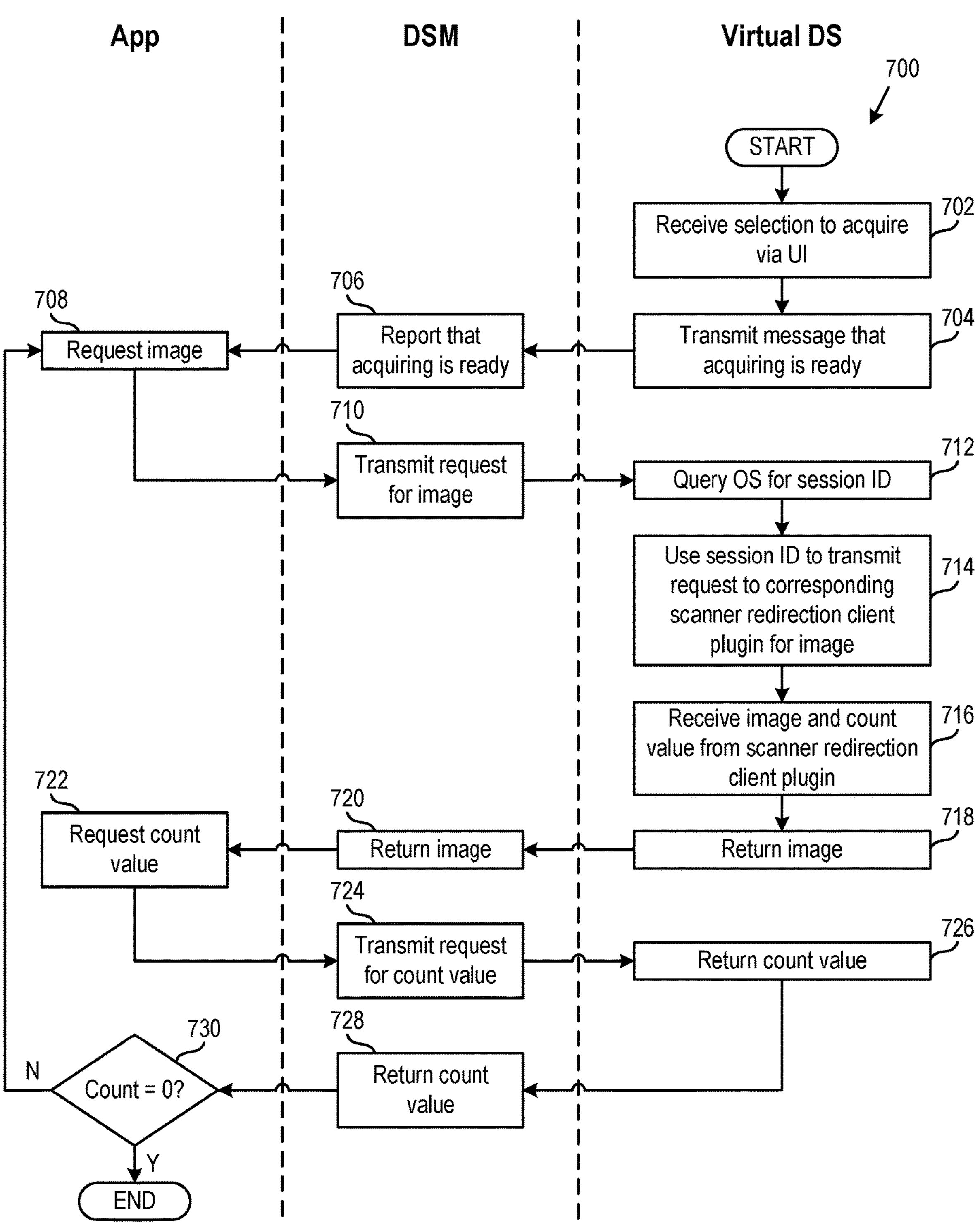
FIG. 7 is a flow diagram of a method performed by the VM of the remote computer to acquire one or more images from a selected ICD, according to embodiments.

FIG. 7 is a flow diagram of a method 700 performed by VM 164 to acquire one or more images from a selected ICD, according to embodiments. Method 700 is discussed with respect to application 168 of RD session 166. However, method 700 is instead performed by an application in another RD session such as RD session 176 if a different user is requesting one or more images using a different RD session of VM 164. For example, if performed by application 178 of RD session 176, steps discussed as being performed by application 168, DSM 300, and virtual DS 310 are instead performed by application 178, DSM 330, and virtual DS 340, respectively.

At step 702, virtual DS 310 receives a selection via UI 318 to acquire an image. For example, the user of RD session 166 may click an "acquire" button of UI 318 to trigger the selection. At step 704, virtual DS 310 transmits a message to DSM 300 indicating that acquiring is ready. At step 706, DSM 300 reports to application 168 that acquiring is ready. At step 708, application 168 calls DSM entry 302 to request an image from DSM 300.

At step 710, DSM 300 calls virtual DS entry 314 to transmit a request to virtual DS 310 for the image. At step 712, virtual DS 310 queries guest OS 182 for the session ID of RD session 166. At step 714, upon receiving the session ID, virtual DS 310 transmits a request to scanner redirection client plugin 118 via a TCP or UDP channel between client RDPVCB plugin 260 and agent RDPVCB plugin 360. As discussed earlier, virtual DS 310 communicates with RDPVCB plugin 360 by IPC via IPC library 312. The request to scanner redirection client plugin 118 is for an image from an ICD, the ICD being previously selected by the user via ICD tray process 170 and communicated by ICD tray process 170 to scanner redirection client plugin 118. Virtual DS 310 specifies the session ID so agent RDPVCB plugin 360 knows to transmit the request to client computer 110 and not to client computers of other RD sessions. Step 714 triggers the method of FIG. 8, as discussed further below.

At step 716, virtual DS 310 receives the image and a "count" value from scanner redirection client plugin 118 via the TCP or UDP channel. Count is a variable indicating whether there are any pending images yet to be acquired from the selected ICD. A count value of zero indicates that there are no pending images. A nonzero value indicates that there is at least one pending image.

At step 718, virtual DS 310 transmits the image to DSM 300 as a return value of the call to virtual DS entry 314. At step 720, DSM 300 provides the image to application 168 as a return value of the call to DSM entry 302. At step 722, application 168 calls DSM entry 302 to request DSM 300 for the count value. At step 724, DSM 300 calls virtual DS entry 314 to transmit a request to virtual DS 310 for the count value. At step 726, virtual DS 310 transmits the count value to DSM 300 as a return value of the call to virtual DS entry 314. At step 728, DSM 300 provides the count value to application 168 as a return value of the call to DSM entry 302. At step 730, application 168 checks if the count value is zero. If the count value is nonzero, method 700 returns to step 708, and application 168 calls DSM entry 302 to request another image from DSM 300. Otherwise, if the count value is zero, method 700 ends.

Figure 8:
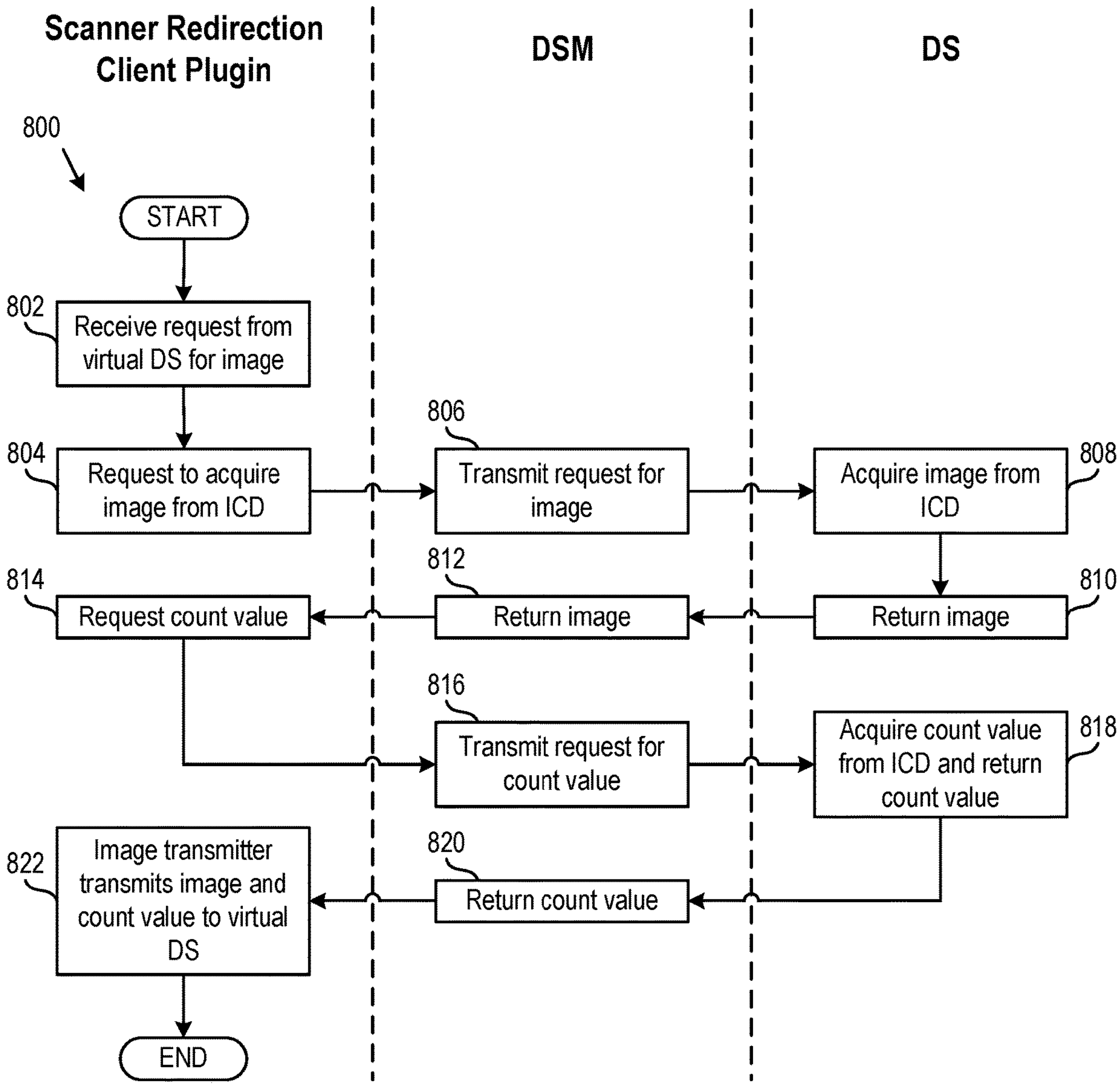
FIG. 8 is a flow diagram of a method performed by a client computer to acquire an image from a selected ICD, according to the first embodiment.

FIG. 8 is a flow diagram of a method 800 performed by a client computer to acquire an image from a selected ICD, according to the first embodiment. Method 800 is discussed with respect to client computer 110 of RD session 166. However, method 800 is instead performed by a client computer using another RD session such as RD session 176 if a different user has requested one or more images using a different RD session of VM 164. For example, if images have been requested via RD session 176, steps discussed as being performed by scanner redirection client plugin 118, DSM 200, and a DS of scanner redirection client plugin 118 are instead performed by scanner redirection client plugin 148 and a DSM and DS thereof, respectively.

At step 802, scanner redirection client plugin 118 receives a request from virtual DS 310 via a TCP or UDP channel between client RDPVCB plugin 260 and agent RDPVCB plugin 360. The request is to acquire an image. At step 804, scanner redirection client plugin 118 calls DSM entry 202 to request DSM 200 to acquire an image. At step 806, DSM 200 calls a DS entry to transmit a request to a DS for the image. For example, if the user previously selected flatbed scanner 270 from ICD tray process 170, DS 210 has already been loaded by scanner redirection client plugin 118 and has already opened a communication session with flatbed scanner 270, and DSM 200 calls DS entry 212 to transmit the request to DS 210.

At step 808, the requested DS communicates with the selected scanner to acquire the image therefrom. At step 810, the requested DS transmits the image to DSM 200 as a return value of the call to the DS entry. At step 812, DSM 200 provides the image to scanner redirection client plugin 118 as a return value of the call to DSM entry 202. At step 814, scanner redirection client plugin 118 calls DSM entry 202 to request DSM 200 for a count value.

At step 816, DSM 210 calls the DS entry, e.g., DS entry 212, to transmit a request to the DS, e.g., DS 210, for the count value. At step 818, the DS acquires the count value from the selected ICD and returns the count value to DSM 200 as a return value of the call to the DS entry. At step 820, DSM 200 provides the count value to scanner redirection client plugin 118 as a return value of the call to DSM entry 202. At step 822, image transmitter 240 transmits the image and count value to virtual DS 310 over the TCP or UDP channel. After step 822, method 800 ends.

Figure 9:
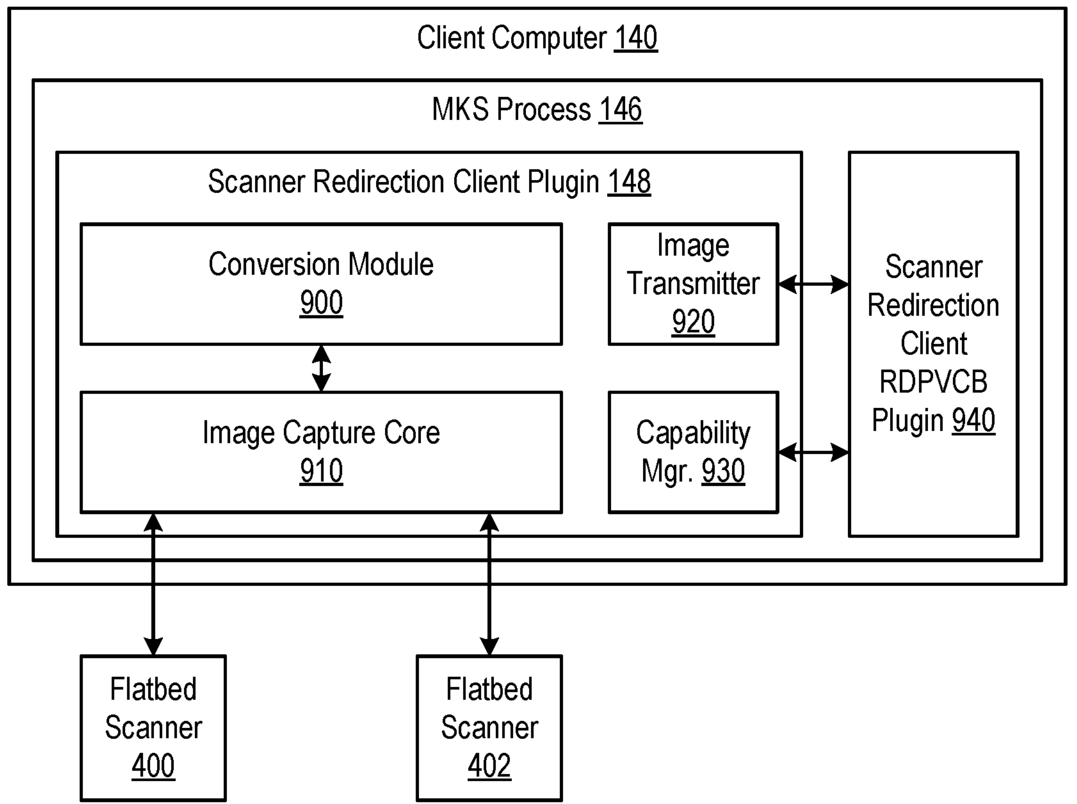
FIG. 9 is a block diagram of a client computer of the RD computer system and a group of ICDs connected to the client computer, according to a second embodiment.

FIG. 9 is a block diagram of client computer 140 and a group of ICDs connected thereto, according to the second embodiment. Although not illustrated in FIG. 9, according to the second embodiment, client computer 110 includes similar components and functionalities as client computer 140. According to the second embodiment, client computer 140 uses a different scanning protocol (e.g., the ICA framework) than that of VM 164. In the example of FIG. 9, there are two drivers installed in client computer 140 for controlling the depicted ICDs: one for controlling flatbed scanner 400 and one for controlling flatbed scanner 402.

In addition to scanner redirection client plugin 148, MKS process 146 includes a scanner redirection client RDPVCB plugin 940. Client RDPVCB plugin 940 is communication software that is configured to communicate with VM 164 via TCP or UDP channels. Client RDPVCB plugin 940 is also configured to communicate with an image transmitter 920 and a capability manager 930, which are discussed further below. Communication between scanner redirection client plugin 148 and individual components thereof and communication between the individual components, are facilitated via API calls.

Similar to the first embodiment, scanner redirection client plugin 148 includes image capturing software that communicates with ICDs to acquire images therefrom. However, according to the second embodiment, the image capturing software is an image capture core 910 instead of one or more DSs. To communicate with image capture core 910, scanner redirection client plugin 148 makes an API call to image capture core 910 to transmit commands thereto. Image capture core 910 then returns results to scanner redirection client plugin 148 via return values to the API call.

When image capture core 910 acquires an image from an ICD, image transmitter 920 transmits the image to VM 164 via client RDPVCB plugin 940. Additionally, image capture core 910 may acquire capabilities from an ICD such as different supported resolutions for acquired images. Capability manager 930 transmits the capabilities to VM 164 via client RDPVCB plugin 940. If the user specifies to adjust settings for a particular ICD, scanner redirection client plugin 148 instructs image capture core 910 to control the ICD to adjust those settings.

Because client computer 140 uses a different scanning protocol, scanner redirection client plugin 148 includes a conversion module 900. Conversion module 900 converts data between different scanning protocols. For example, if capability manager 930 receives a request from VM 164 to view capabilities of a particular ICD, then once image capture core 910 acquires those capabilities, conversion module 900 converts the capabilities to the scanning protocol of VM 164. Capability manager 930 then transmits them to VM 164. If capability manager 930 receives settings from VM 164 to apply to an ICD, scanner redirection client plugin 148 instructs conversion module 900 to convert the selected settings to the scanning protocol of client computer 140 to be understood by image capture core 910 and applied to the ICD.

Figure 10:
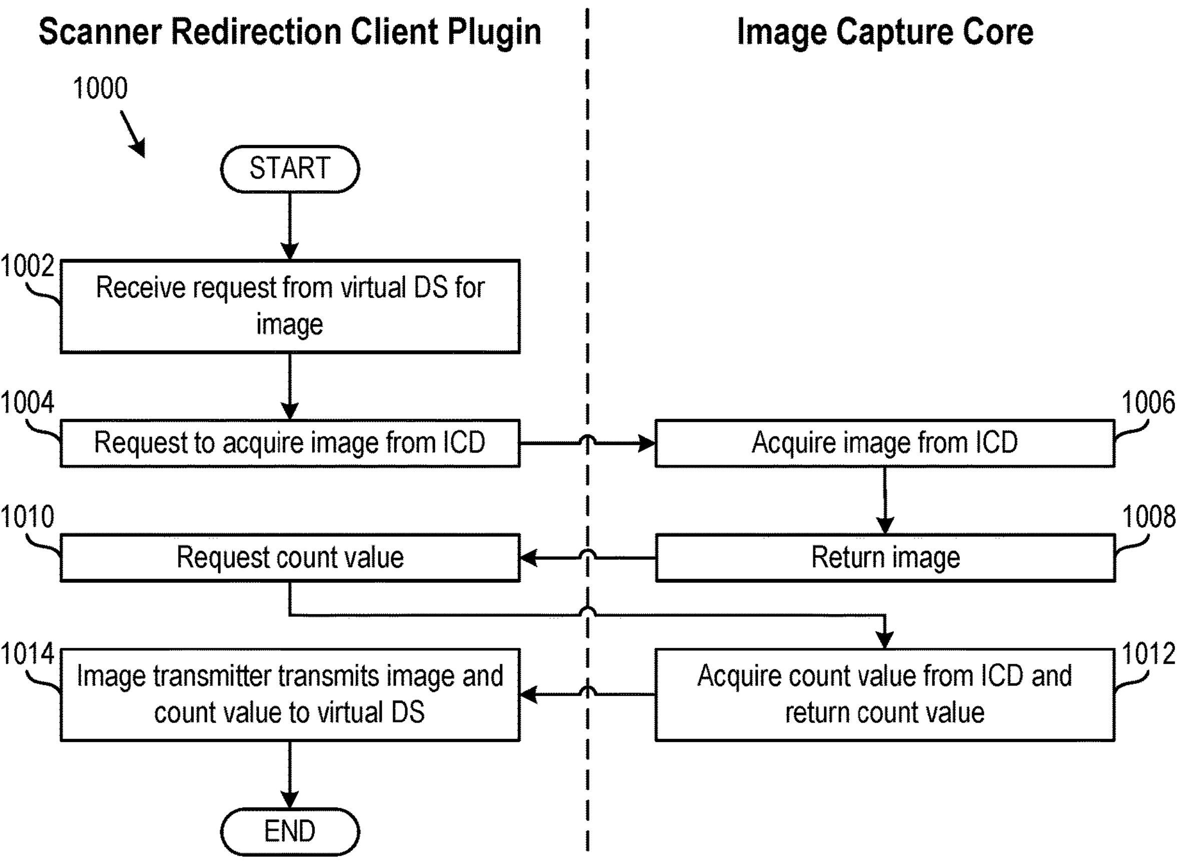
FIG. 10 is a flow diagram of a method performed by a client computer to acquire an image from a selected ICD, according to the second embodiment.

FIG. 10 is a flow diagram of a method 1000 performed by a client computer to acquire an image from a selected ICD, according to the second embodiment. Method 1000 is discussed with respect to client computer 140 of RD session 176. However, method 1000 is instead performed by a client computer using another RD session such as RD session 166 if a different user has requested one or more images using a different RD session of VM 164. For example, if images have been requested via RD session 166, steps discussed as being performed by scanner redirection client plugin 148 and image capture core 910 are instead performed by scanner redirection client plugin 118 and an image capture core thereof, respectively.

At step 1002, scanner redirection client plugin 148 receives a request from virtual DS 310 of VM 164 to acquire an image. The request is received over a TCP or UDP channel between client RDPVCB plugin 940 and agent RDPVCB plugin 360. At step 1004, scanner redirection client plugin 148 requests image capture core 910 to acquire the image from a selected ICD by making an API call to image capture core 910. For example, if the user previously selected flatbed scanner 400 from ICD tray process 180, scanner redirection client plugin 148 has already provided this selection information to image capture core 910. In response to this selection, image capture core 910 has already opened a communication session with flatbed scanner 400.

At step 1006, image capture core 910 communicates with the selected scanner to acquire the image therefrom. At step 1008, image capture core 910 provides the image to scanner redirection plugin 148 as a return value of the API call. At step 1010, scanner redirection client plugin 148 requests image capture core 910 for a count value by making another API call to image capture core 910. At step 1012, image capture core 910 acquires the count value from the selected ICD, e.g., flatbed scanner 400, and provides the count value to scanner redirection client plugin 148 as a return value of the API call. At step 1014, image transmitter 920 transmits the image and count value to virtual DS 310 over the TCP or UDP channel. After step 1014, method 1000 ends. It should be noted that image capture core 910 acquires images from ICDs asynchronously. For example, image capture core 910 may acquire multiple images and return them all before scanner redirection client plugin 148 requests the count value at step 1010.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are magnetic drives, SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A scanner redirection method for a remote desktop computer system, wherein the remote desktop computer system includes a plurality of client computers and a remote computer, and wherein the remote computer concurrently has a first remote desktop session with a first client computer of the client computers and a second remote desktop session with a second client computer of the client computers, the scanner redirection method comprising:

determining, by the remote computer by communicating with the first client computer, that the first client computer has installed first drivers of one or more first image capturing devices, and based on the first client computer having installed the first drivers, creating a first list of the one or more first image capturing devices, wherein the first list is accessible to the first remote desktop session but is inaccessible to the second remote desktop session;

determining, by the remote computer by communicating with the second client computer, that the second client computer has installed second drivers of one or more second image capturing devices, and based on the second client computer having installed the second drivers, creating a second list of the one or more second image capturing devices, wherein the second list is accessible to the second remote desktop session but is inaccessible to the first remote desktop session;

transmitting, by the remote computer to the first client computer after receiving a selection of a first image capturing device from the first list, an identifier (ID) of the selected first image capturing device and a request to acquire a first image; and receiving the requested first image by the remote computer from the first client computer, and then providing the received first image by the remote computer to an application running on the remote computer in the first remote desktop session, wherein the first image was created by the selected first image capturing device.

2. The scanner redirection method of claim 1, further comprising:

creating in the first remote desktop session using a session ID of the first remote desktop session, a first tray process that stores the first list and that displays the first list to a first user to enable the first user to select the first image capturing device; and creating in the second remote desktop session using a session ID of the second remote desktop session, a second tray process that stores the second list and that displays the second list to a second user to enable the second user to select a second image capturing device.

3. The scanner redirection method of claim 1, wherein the remote computer uses a session ID of the first remote desktop session to transmit the ID of the selected first image capturing device to the first client computer.

4. The scanner redirection method of claim 1, wherein the remote computer uses a session ID of the first remote desktop session to transmit the request to the first client computer to acquire the first image.

5. The scanner redirection method of claim 1, wherein the first remote desktop session is between the first client computer and a virtual machine (VM) of the remote computer, and wherein the second remote desktop session is between the second client computer and the VM.

6. The scanner redirection method of claim 1, further comprising:

transmitting, by the remote computer to the second client computer after receiving a selection of a second image capturing device from the second list, an ID of the selected second image capturing device and a request to acquire a second image; and receiving the requested second image by the remote computer from the second client computer, and then providing the received second image by the remote computer to an application running on the remote computer in the second remote desktop session, wherein the second image was created by the selected second image capturing device.

7. The scanner redirection method of claim 1, further comprising:

before creating the first list, receiving, by the remote computer from the first client computer, IDs of the one or more first image capturing devices, wherein the first list is created from the IDs received from the first client computer; and before creating the second list, receiving, by the remote computer from the second client computer, IDs of the one or more second image capturing devices, wherein the second list is created from the IDs received from the second client computer.

8. A non-transitory computer-readable medium comprising instructions that are executable in a remote desktop computer system, wherein the instructions when executed cause the remote desktop computer system to carry out a scanner redirection method, the remote desktop computer system including a plurality of client computers and a remote computer, and the remote computer concurrently having a first remote desktop session with a first client computer of the client computers and a second remote desktop session with a second client computer of the client computers, and wherein the scanner redirection method comprises:

determining, by the remote computer by communicating with the first client computer, that the first client computer has installed first drivers of one or more first image capturing devices, and based on the first client computer having installed the first drivers, creating a first list of the one or more first image capturing devices, the first list being accessible to the first remote desktop session but being inaccessible to the second remote desktop session;

determining, by the remote computer by communicating with the second client computer, that the second client computer has installed second drivers of one or more second image capturing devices, and based on the second client computer having installed the second drivers, creating a second list of the one or more second image capturing devices, the second list being accessible to the second remote desktop session but being inaccessible to the first remote desktop session;

transmitting, by the remote computer to the first client computer after receiving a selection of a first image capturing device from the first list, an identifier (ID) of the selected first image capturing device and a request to acquire a first image; and receiving the requested first image by the remote computer from the first client computer, and then providing the received first image by the remote computer to an application running on the remote computer in the first remote desktop session, the first image being created by the selected first image capturing device.

9. The non-transitory computer-readable medium of claim 8, wherein the scanner redirection method further comprises:

creating in the first remote desktop session using a session ID of the first remote desktop session, a first tray process that stores the first list and that displays the first list to a first user to enable the first user to select the first image capturing device; and creating in the second remote desktop session using a session ID of the second remote desktop session, a second tray process that stores the second list and that displays the second list to a second user to enable the second user to select a second image capturing device.

10. The non-transitory computer-readable medium of claim 8, wherein the remote computer uses a session ID of the first remote desktop session to transmit the ID of the selected first image capturing device to the first client computer.

11. The non-transitory computer-readable medium of claim 8, wherein the remote computer uses a session ID of the first remote desktop session to transmit the request to the first client computer to acquire the first image.

12. The non-transitory computer-readable medium of claim 8, wherein the first remote desktop session is between the first client computer and a virtual machine (VM) of the remote computer, and wherein the second remote desktop session is between the second client computer and the VM.

13. The non-transitory computer-readable medium of claim 8, wherein the scanner redirection method further comprises:

transmitting, by the remote computer to the second client computer after receiving a selection of a second image capturing device from the second list, an ID of the selected second image capturing device and a request to acquire a second image; and receiving the requested second image by the remote computer from the second client computer, and then providing the received second image by the remote computer to an application running on the remote computer in the second remote desktop session, the second image being created by the selected second image capturing device.

14. The non-transitory computer-readable medium of claim 8, wherein the scanner redirection method further comprises:

before creating the first list, receiving, by the remote computer from the first client computer, IDs of the one or more first image capturing devices, the first list being created from the IDs received from the first client computer; and before creating the second list, receiving, by the remote computer from the second client computer, IDs of the one or more second image capturing devices, the second list being created from the IDs received from the second client computer.

15. A remote computer of a remote desktop computer system, the remote desktop computer system comprising a plurality of client computers including a first client computer and a second client computer, and the remote computer concurrently having a first remote desktop session with the first client computer and a second remote desktop session with the second client computer, wherein the remote computer is configured to execute on a processor of a hardware platform to:

determine, by communicating with the first client computer, that the first client computer has installed first drivers of one or more first image capturing devices, and based on the first client computer having installed the first drivers, create a first list of the one or more first image capturing devices, the first list being accessible to the first remote desktop session but being inaccessible to the second remote desktop session;

determine, by communicating with the second client computer, that the second client computer has installed second drivers of one or more second image capturing devices, and based on the second client computer having installed the second drivers, create a second list of the one or more second image capturing devices, the second list being accessible to the second remote desktop session but being inaccessible to the first remote desktop session;

transmit, to the first client computer after receiving a selection of a first image capturing device from the first list, an identifier (ID) of the selected first image capturing device and a request to acquire a first image; and receive the requested first image from the first client computer, and then provide the received first image to an application running on the remote computer in the first remote desktop session, the first image being created by the selected first image capturing device.

16. The remote computer of claim 15, further configured to:

create in the first remote desktop session using a session ID of the first remote desktop session, a first tray process that stores the first list and that displays the first list to a first user to enable the first user to select the first image capturing device; and create in the second remote desktop session using a session ID of the second remote desktop session, a second tray process that stores the second list and that displays the second list to a second user to enable the second user to select a second image capturing device.

17. The remote computer of claim 15, wherein the remote computer uses a session ID of the first remote desktop session to transmit the ID of the selected first image capturing device to the first client computer.

18. The remote computer of claim 15, wherein the remote computer uses a session ID of the first remote desktop session to transmit the request to the first client computer to acquire the first image.

19. The remote computer of claim 15, wherein the first remote desktop session is between the first client computer and a virtual machine (VM) of the remote computer, and wherein the second remote desktop session is between the second client computer and the VM.

20. The remote computer of claim 15, further configured to:

transmit, to the second client computer after receiving a selection of a second image capturing device from the second list, an ID of the selected second image capturing device and a request to acquire a second image; and receive the requested second image from the second client computer, and then provide the received second image to an application running on the remote computer in the second remote desktop session, the second image being created by the selected second image capturing device.

* * * * *